United States Patent [19]

Januska

[11] Patent Number: 4,775,442

[45] Date of Patent: Oct. 4, 1988

[54] APPLICATOR FOR WALLBOARD TAPE

[76] Inventor: Charles F. Januska, Rte. One, Box 232 D, Whaleysville, Md. 21872

[21] Appl. No.: 58,391

[22] Filed: Jun. 5, 1987

[51] Int. Cl.[4] .......................... B32B 35/00; B44C 7/04

[52] U.S. Cl. .................................... 156/575; 156/465; 156/524; 156/577; 156/578; 156/579

[58] Field of Search ............... 156/524, 526, 575, 577, 156/579, 578, 465, 525, 291, 71

[56] References Cited

U.S. PATENT DOCUMENTS 4,220,114 9/1980 Radowicz ........................... 156/578
4,404,054 9/1983 Dickson et al. ...................... 156/575
4,613,396 9/1986 Scarborough ........................ 156/575
4,689,107 8/1987 Entwistle ........................... 156/524

*Primary Examiner*—Michael Wityshyn
*Attorney, Agent, or Firm*—Lawrence J. Shurupoff

[57] ABSTRACT

An apparatus for dispensing wallboard tape and wallboard compound is provided with a nozzle which applies the compound through a series of opposed feed channels. Each feed channel applies a bead of compound to one side of the tape as the tape passes through the nozzle in a longitudinally folded condition. Upon exiting the nozzle the tape is unfolded and the compound is uniformly extruded beneath the tape. Venting grooves extend from the feed channels to the nozzle exit to prevent clogging of the feed channels by the tape.

8 Claims, 5 Drawing Sheets

APPLICATOR FOR WALLBOARD TAPE

BACKGROUND OF THE INVENTION

1. Field of the Invention

This invention relates generally to a drywall finishing apparatus and particularly relates to a simple, lightweight device which applies wallboard compound and wallboard tape to a wallboard joint while wiping the tape and compound, all during the same operative stroke.

2. Description of Prior Developments

Drywall or wallboard is typically fastened to the internal framework of most residential and commercial buildings. Large panels of wallboard are usually nailed to wooden "studs" to form the interior wall and ceiling surfaces. In order to provide a smooth, continuous surface across the cracks or joints formed between abutting wallboard panels, a thin covering strip of a fibrous or paper-like material is applied so as to cover the crack.

Although this covering material lacks any adhesive coating, it is referred to in the trade as wallboard "tape". In order to permanently secure this tape across the wallboard joints, an adhesive called wallboard compound or "mud" is first spread over the wall and the tape is subsequently applied to the joint. This procedure has typically required considerable effort and skill. In order to expedite this tape application procedure, various devices have been developed which simultaneously apply the tape and compound over the joint.

While these applicators generally apply tape and compound at a faster rate than that possible by manual methods using simple hand tools, they have been found to perform less than totally satisfactorily. That is, most conventional mechanized tape and compound applicators experience one or more annoying drawbacks. This has resulted in generally poor acceptance of these devices by the building trades.

A particularly bothersome drawback of several conventional compound and tape applicators is the need to wipe down the tape and compound once it has been applied to the joint. That is, these applicators are unable to adequately smooth or iron out the tape and compound so as to form a continuous, even surface during the same stroke with which they are dispensed. This condition requires an additional follow-up or clean-up procedure wherein excess compound is removed with a putty knife and irregularities such as bumps and bubbles formed beneath the tape are flattened. In practice, this type of operation requires at least two workmen—one to operate the applicator and one to follow behind to clean up the excess compound and smooth out any surface imperfections.

The irregularities referred to above are often the result of an intermittent or poorly controlled wallboard compound feed rate. In practice, an operator will often apply wallboard tape in an intermittent manner, sometimes imparting a jerking or discontinuous stop-and-go motion to the tape. With conventional applicators, such tape dispensing motion would often result in an uneven coating of compound applied to the tape. Discontinuities in the applied layer of compound would result, such as thin compound sections or dry tape sections with no compound, as well as thick, bumpy or lumpy regions.

Several devices are fed by a spring-loaded mechanism similar to those used in grease guns. These spring-loaded feed mechanisms frequently fail to provide a smooth, continuous supply of compound to the applicator nozzle. This results in a sporadic flow of compound to the tape and generates bubbles within the compound which appear as bumps or depressions beneath the tape.

Another drawback associated with presently available automated or mechanized tape and compound applicators is their cumbersome and complicated structure. An applicator loaded with compound can weigh up to 40 pounds and extend over a length of 4 to 5 feet. Use of such a device rapidly fatigues the operator. Moreover, fine finishing work is most difficult to achieve with such an awkward, heavy device.

The complicated structure of many applicators leads to frequent breakdowns and necessitates involved and costly repairs. One such applicator is known to include over 20 moving parts and is highly prone to mechanical failure.

Still another drawback of prior applicators is their inability to adequately produce a clean, "tight" corner or angle joint. That is, while somethat satisfactory results have been achieved in applying tape and compound on flat surfaces, angle joints formed along corners and at the junction of walls and ceilings have continually presented an unsolved problem to conventional applicators. The applicators are simple unable to evenly apply the tape and compound at the 90 degree angle typically formed at corners and at wall-ceiling joints.

Another problem common to prior applicators is their inability to dispense a uniform and easily controllable layer of compound upon a moving strip of tape as the tape passes through the applicator nozzle. Prior nozzles which direct the tape past and/or through a pressurized flow of compound have caused partial clogging of the compound feed paths so that only a portion of the tape is covered with compound. That is, due to an uneven balancing or application of compound feed pressure along or across different portions of the tape, the tape can be forced against the compound outlets, thereby effectively closing them.

Accordingly, a need exists for a simple, lightweight applicator which smoothly and efficiently applies a continuous and even coating of wallboard compound to a strip of wallboard tape and which simultaneously wipes down the tape so as to obviate the need for a subsequent wiping and clean-up procedure. A need also exists for a wallboard compound applicator which evenly balances and applies a pressurized flow of compound upon a moving strip of tape so that clogging of the compound feed ports is prevented.

The realization of these and various other objects, features and attendant advantages of the present invention will be more fully appreciated from the following description when considered in connection with the accompanying drawings, in which the same reference numbers designate the same or corresponding parts throughout.

BRIEF DESCRIPTION OF THE DRAWINGS

The various details of the present invention are described hereinafter with reference to the drawings in which.

DETAILED DESCRIPTION OF THE PREFERRED EMBODIMENTS

Figure 1:
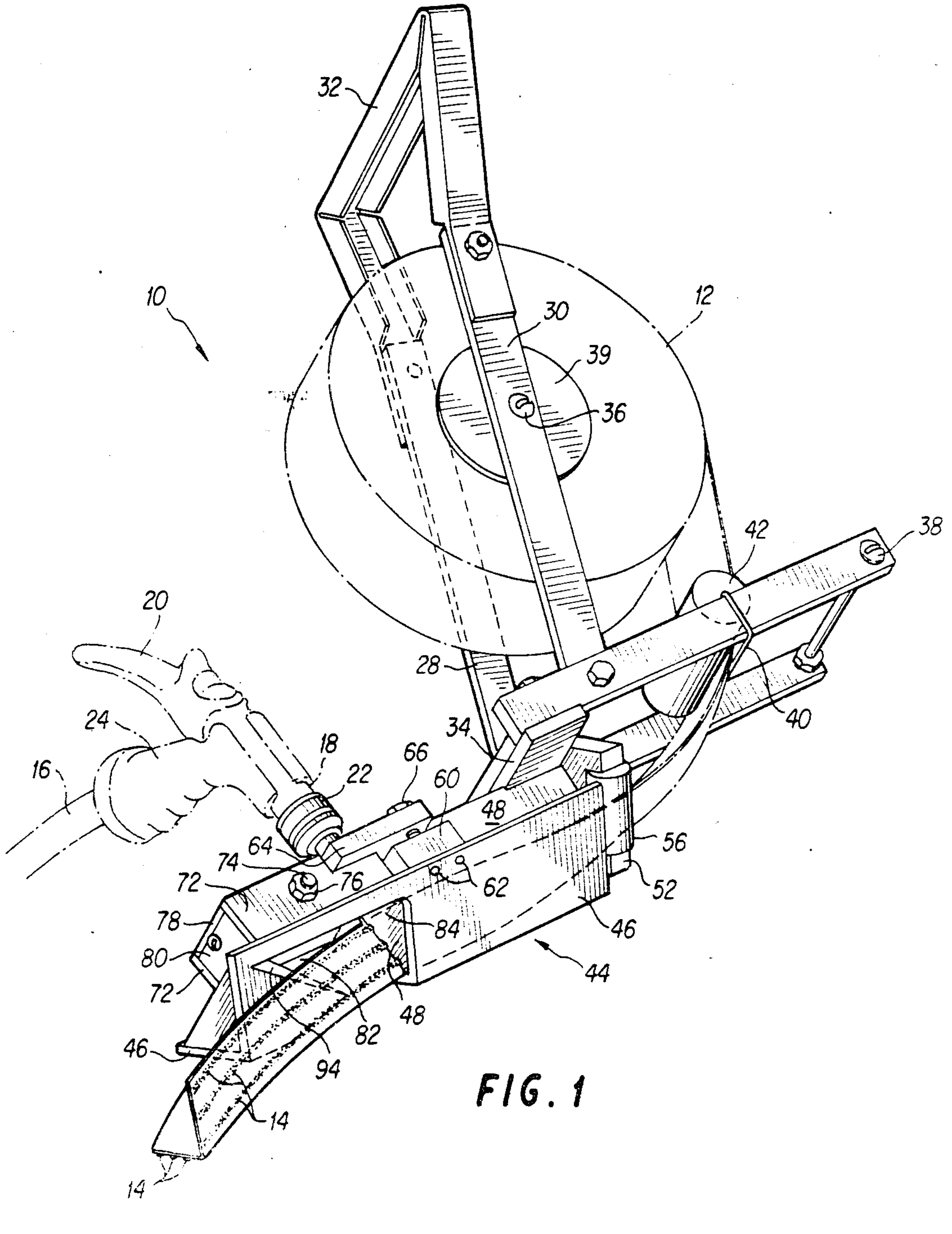
FIG. 1 is a perspective view of the applicator showing the tape feed path.

The invention will now be described in conjunction with the accompanying drawings, beginning with FIG. 1 which shows the applicator 10 in an operative position for dispensing wallboard tape 12 and wallboard compound 14 over a crack such as formed between abutting wallboards and the like. A pressurized container of known construction is typically filled with wallboard compound and pressurized at a suitable pressure, such as 100 psi.

The wallboard compound, known in the trade as "mud", is fed from the pressurized container to the applicator via hose 16. A metering valve 18 is mounted on the applicator and connected to hose 16 to allow an operator to adjust the flow of mud through the applicator to any desired rate by controlling the valve opening with valve actuator lever 20. Alternatively, the metering valve may be mounted on the pressurized container and set at a fixed value to allow the operator to apply the mud and tape in a continuous uninterrupted manner.

Although metering valve 18 may be immovably connected to the applicator and mounted in a fixed position, it is generally preferable to adjustably mount the valve to the applicator with a rotatable pressure coupling sleeve 22 of known construction. In this manner, an operator may rotate handle 24 to the most effective and comfortable position as the applicator is manipulated over a wallboard joint.

The applicator is provided with a pair of L-shaped frame members or braces 28,30 which are interconnected by handle 32, cross brace 34, and axle and pin members 36 and 38. A roll of tape 12 is removably mounted between the frame members upon tape spindle 39 mounted over axle 36. The tape is guided over a spool or roller 42 which is rotatably mounted over clip 40. The clip may be longitudinally frictionally adjustable along the base of the L-shaped frame members to achieve the smoothest feed of tape into the applicator. An applicator head 44 is fixed to the frame members to receive the tape after it passes over spool 42.

Figure 2:
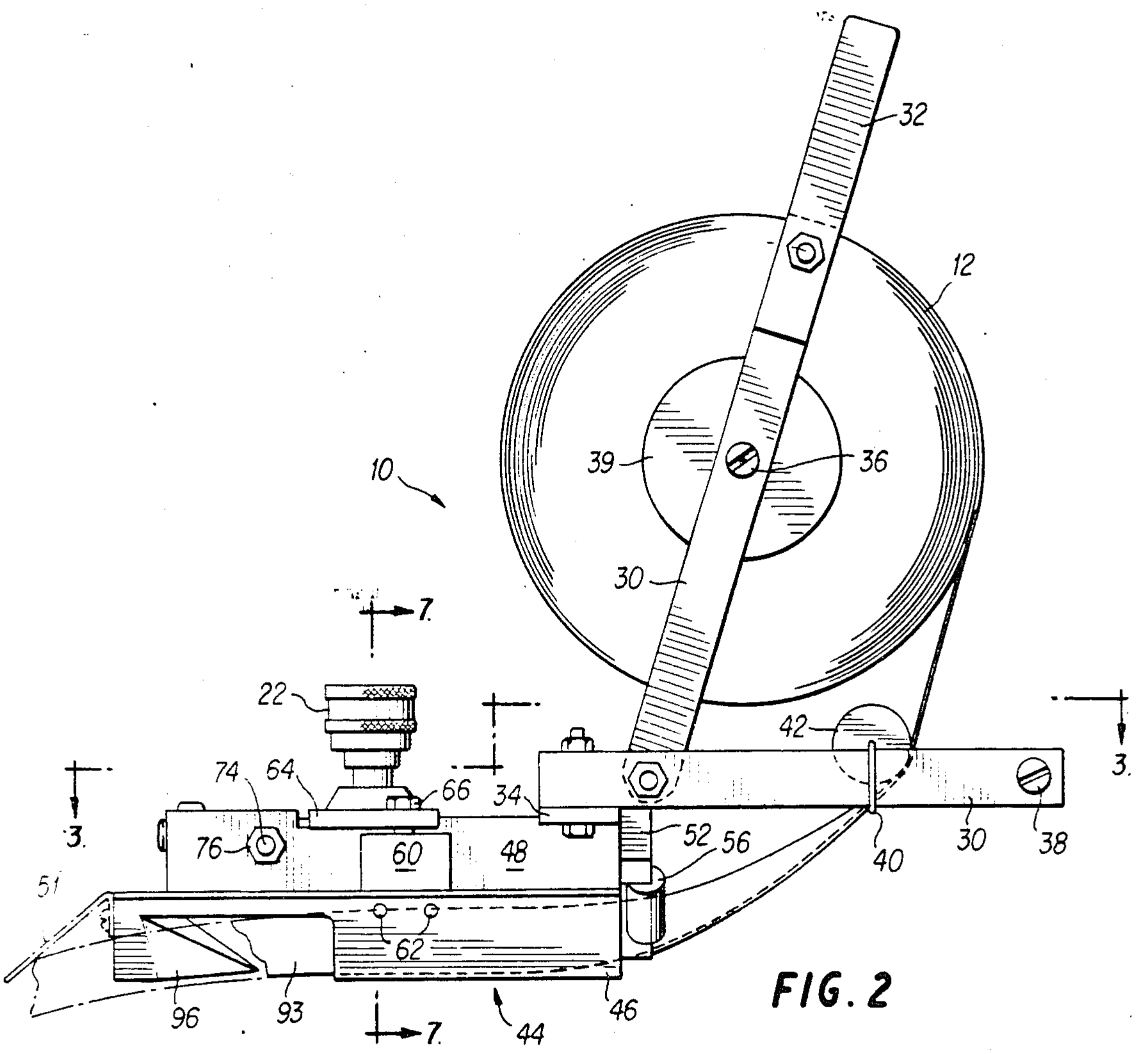
FIG. 2 is a side elevation view of the applicator.
Figure 3:
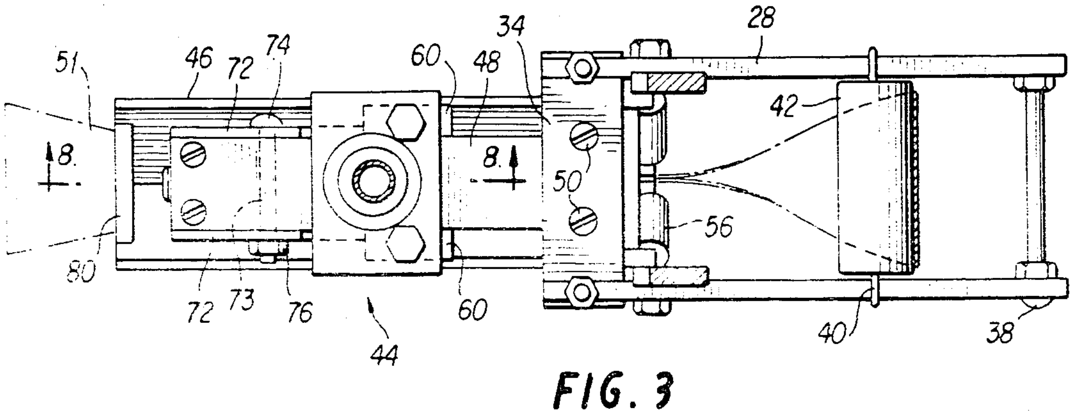
FIG. 3 is a top plan view taken along line 3—3 of FIG. 2.
Figure 4:
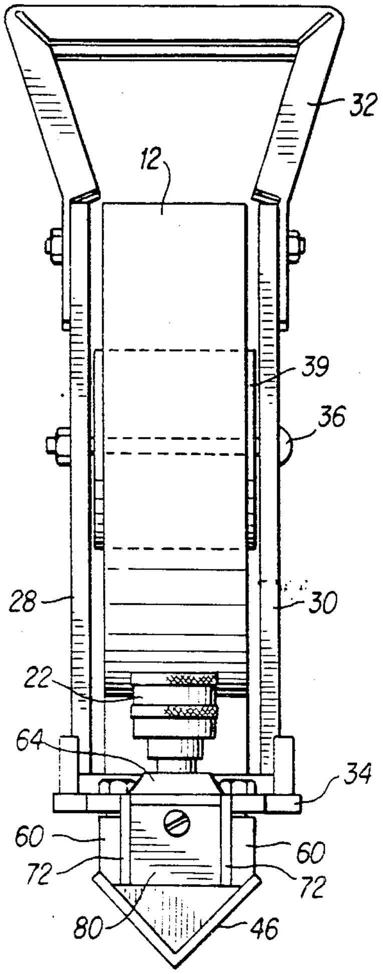
FIG. 4 is a front elevation view of the applicator.

The applicator head includes a nozzle trough or housing 46 and a nozzle body 48. The nozzle body is tightly nested within tbhe trough as shown in greater detail in FIGS. 2 through 9 and as discussed below. As seen in FIG. 3, the frame members 28,30 and cross brace 34 are removably attached to the applicator head with threaded fasteners 50 which secure the cross brace to the nozzle body. The applicator head 44 is intended for corner taping applicators although it may easily be adapted for use with flat joints such as by adding a flat detachable trowel 51 to the front of the applicator as shown in phantom in FIGS. 2 and 3. The outer 90° contour of the nozzle trough is generally V-shaped in transverse cross section to match or complement the V-shaped 90° corner junction defined between walls, ceilings, and the like.

Figure 5:
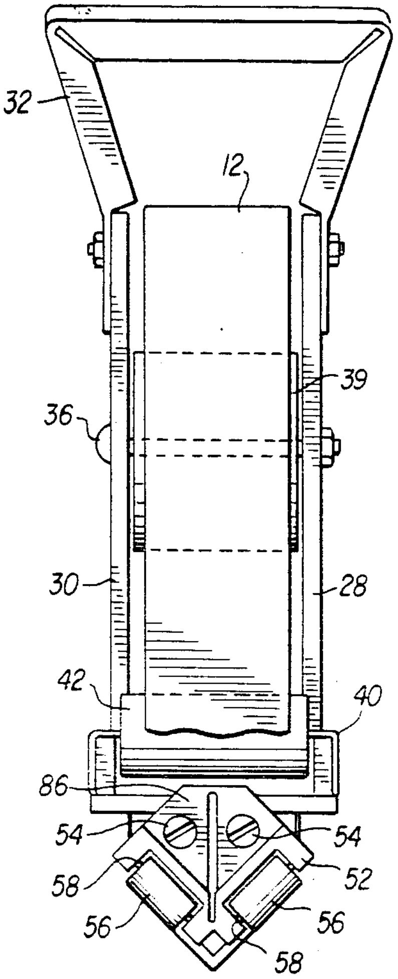
FIG. 5 is a rear elevation view of the applicator.
Figure 6:
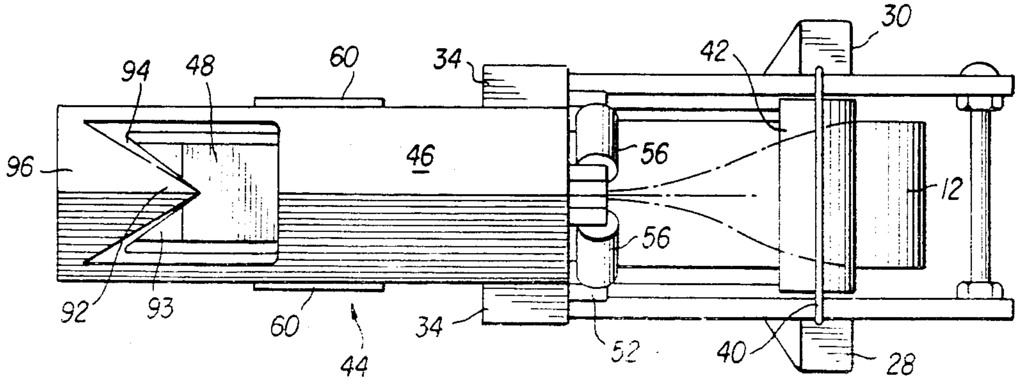
FIG. 6 is a bottom plan view of the applicator.

As best seen in FIG. 5, a roller mounting plate 52 is secured against the rear of the nozzle trough 46 with threaded fasteners 54. These fasteners are anchored within the nozzle body 48. A pair of rollers 56 is rotatably mounted on shafts 58 which are fixed within the mounting plate. The rollers extend slightly beyond or outwardly of the outer surface profile of the trough to engage the wallboard and allow the applicator head to roll smoothly and easily along and over a joint as the tape and compound are simultaneously applied.

In FIGS. 1-4 the nozzle body is shown clamped within the trough in a manner which allows its quick and easy remoable such as for cleaning and maintenance purposes. A pair of lateral anchor blocks 60 is rigidly pinned to opposing sides of the trough with pins 62 to provide lateral support to the nozzle body and to serve as an anchor for vertically clamping the nozzle body within the trough.

Figure 7:
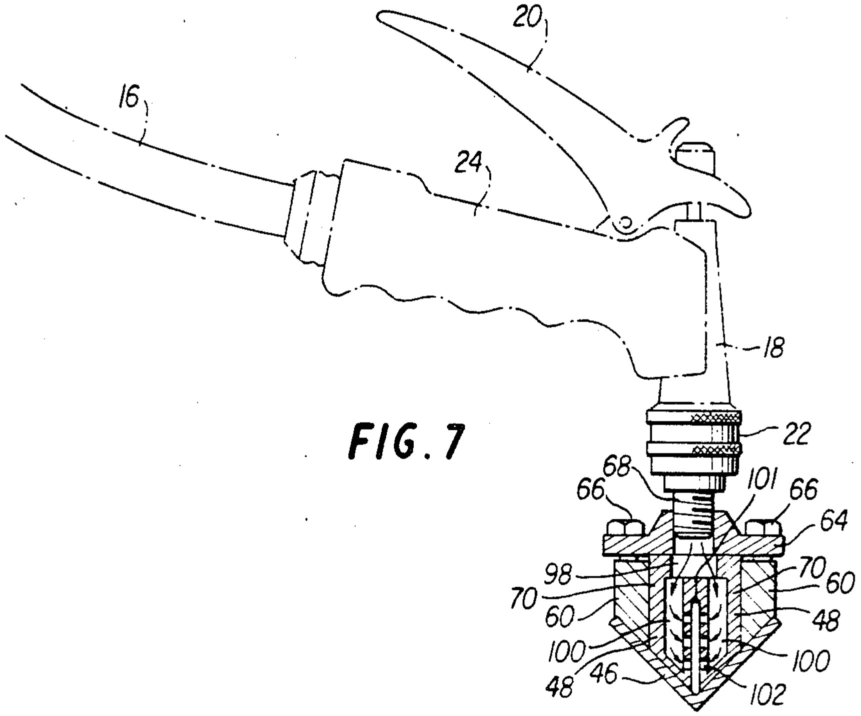
FIG. 7 is a sectional view taken through line 7—7 of FIG. 2.
Figure 8:
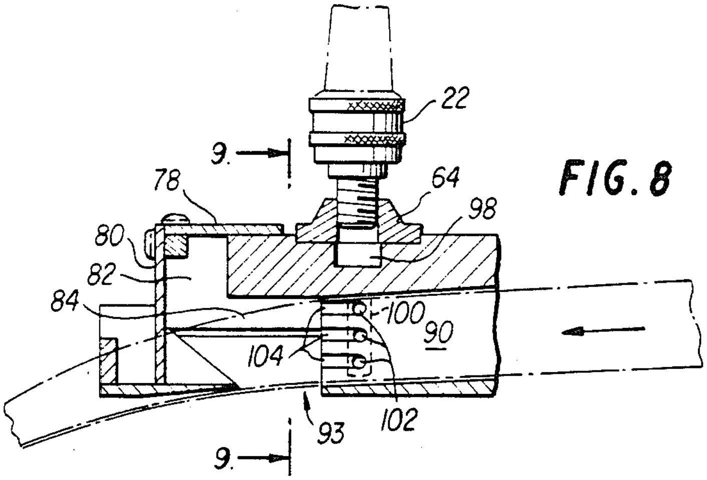
FIG. 8 is a sectional view taken through line 8—8 of FIG. 3.

Vertical clamping force is applied with cap 64 which is forcibly pressed against the top of the nozzle body by the torque of threaded fasteners 66. In this manner, the nozzle body is securely wedged within the trough. As seen in FIGS. 7 and 8, cap 64 is formed with a threaded bore for receiving the threaded portion 68 of the rotatable coupling sleeve 22.

Figure 9:
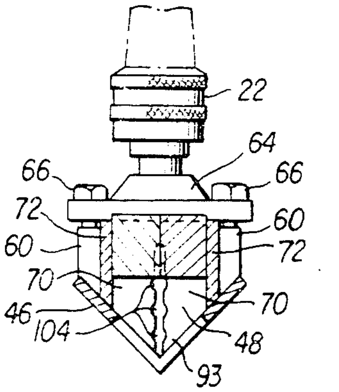
FIG. 9 is a sectional view taken through line 9—9 of FIG. 8.
Figure 10:
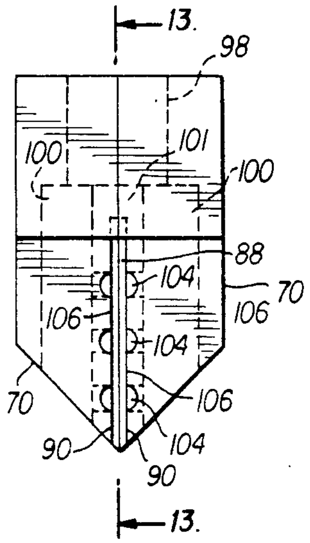
FIG. 10 is a front elevation view of the nozzle body showing the compound feed path in phantom.
Figure 11:
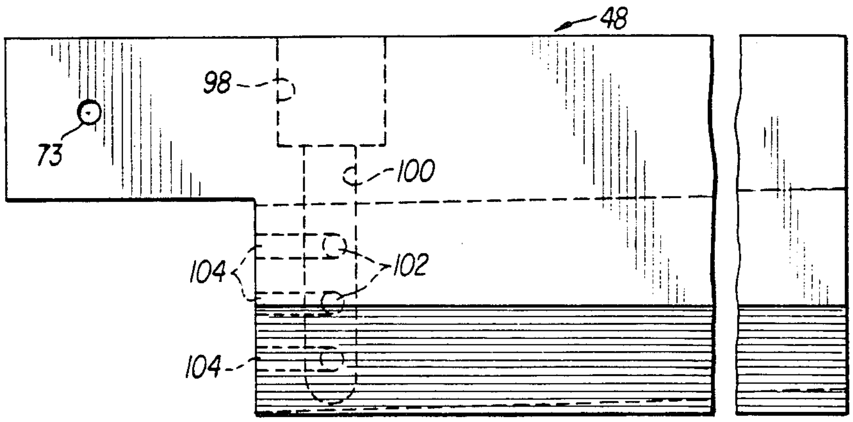
FIG. 11 is a side elevation view of the nozzle body of FIG. 10.
Figure 12:
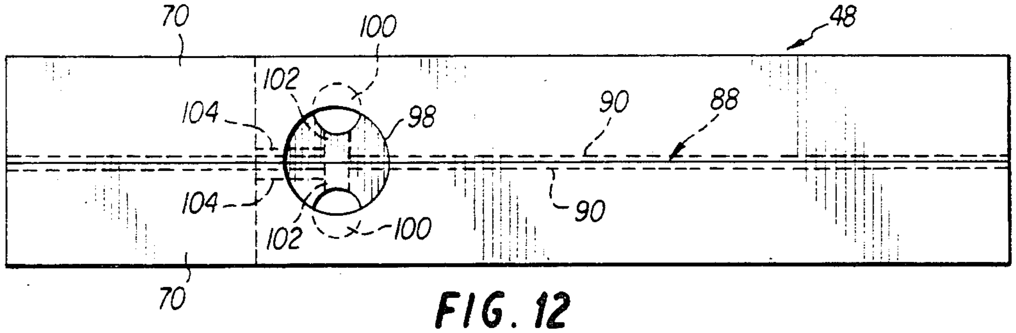
FIG. 12 is a top plan view of the nozzle body of FIG. 10.

The nozzle body 48 is actually a two-piece member which is longitudinally split and separable. This two-piece assembly is best seen in FIGS. 10 and 12 wherein mirror image nozzle body halves 70 are seen properly aligned for mounting within the trough. To maintain the body halves in proper alignment, a pair of clamping plates 72 is provided adjacent each body half as seen in FIGS. 1, 3 and 9. A carefully aligned bore 73 is formed through both body halves 70 and through each plate 72. A bolt 74 is fitted through the bore and torqued with nut 76 to clamp the nozzle body halves together.

A top cover 78 and a front end cover 80 are mounted between the clamping plates 72 to form a closed chamber 82 as seen in FIGS. 1 and 8 wherein the tape forms the floor of chamber 82 while the front end cover securely nests against the inner walls of the trough 46. Chamber 82 chatches excess compound or mud, if any, which may exit the nozzle above the upper edge 84 of the tape 12.

A significant aspect of the invention is the manner in which the tape is fed through the nozzle body and out of the trough to cover a joint. Generally, the tape enters the applicator head through a slot 86 formed through the roller mounting plate 52, as seen in FIG. 5. Slot 86 is aligned with an internal passage 88 formed between the nozzle body halves 70. Passage 88 is best seen in FIGS. 10—13 wherein a shallow recess 90 is formed in the internal face or sidewall of each nozzle body half to define the passage.

Figure 13:
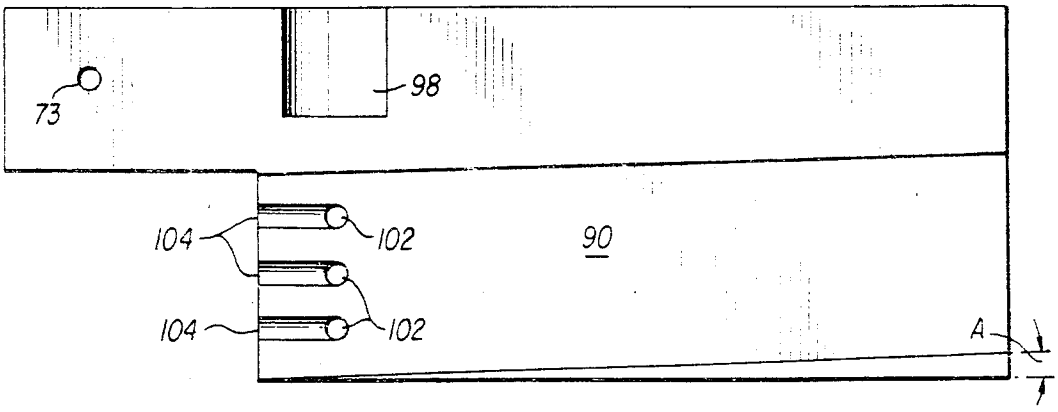
FIG. 13 is a side elevation view of the inside face of the nozzle body taken along line 13—13 of FIG. 10.

The height and width of passage 88 are respectively dimensioned slightly larger than half the width and twice the thickness of the tape to be applied. This allows for a small clearance to let the tape slip easily through the passage since the tape is folded in half as it enters the passage such that its width is halved and its thickness doubled. To further minimize tape drag, the angle A of the passage as seen in FIG. 13 should be kept small, preferably below 15°.

When the tape exits the nozzle body it is unfolded by a spreading wedge 92 formed as part of the wall of the trough adjacent the tape opening 93 formed therein. The spreading wedge is provided with chamfered walls 94 which prevent tearing of the tape and ensure smooth and easy tape spreading. Once the tape exits through opening 93 and passes the walls 94, it is guided and forced into a joint by the beveled or V-shaped nose portion 96 of the trough. The compound which has been applied to the tape in bead-like fashion within the nozzle body is then uniformly extruded over and across the underside of the tape to form a continuous uniform layer of compound which does not extend past the edges of the tape.

A most significant feature of the invention is the manner in which the compound is applied to the tape. As noted above and as depicted in FIG. 7, pressurized compound is fed along a path through hose 16, valve 18 and coupling 22. The compound then passes through cap 64 and enters port 98 formed within the nozzle body. Port 98 communicates with feed headers 100 which extend through each nozzle body half 70 adjacent each recess 90. Each feed header receives pressurized compound from port 98 and distributes the compound in a series of longitudinal beads across the surface of opposite sides of the folded tape via feed channels 102.

Feed channels 102 are spaced apart along the surface of the tape and are preferably aligned so that the channels formed in one body half are directly opposite those found in the other body half. Preferably, the axes of the opposing channels are coaxially aligned. This arrangement effectively balances the feed pressure across the tape and minimizes the resistance to tape movement through the nozzle body. This is important because excessive drag or friction on the tape can cause the tape to tear resulting in an uneven application of compound on the tape and promote clogging.

Although the opposing alignment of the feed channels is necessary to reduce drag, it is also necessary to form a continuous series of even and unbroken beads or lines of compound along the tape. If the compound feed pressure on one side of the tape is greater than that on the other, the folded tape will be forced against the internal wall of the shallow recess 90 on the low pressure side of the tape. This condition can force the tape to block the feed channels 102 on the low pressure side and cause an interruption in the flow of compound onto this side of the tape. Although reference is made to the high and low pressure sides of the tape, the compound is only applied to one side of the tape, the underside which is applied to the joint, since the tape is in a longitudinally folded condition as it passes through the nozzle body.

The compound is prevented from contacting the upper portion of the tape (the inner folded portion) and spreading the folded tape apart within the nozzle body by roof portion 101 shown in FIGS. 7 and 10. This is most important in order to form a clean joint with no exposed compound on the tape surface.

To prevent the tape from blocking the flow of compound from the feed channels, each feed channel is allowed to communicate with the amibient atmosphere via venting grooves 104. These grooves are formed within the surface of each recess 90 and extend from the exit of the feed channels to the exit of the nozzle body. Even if a pressure differential may occasionally develop across the tape between opposing feed channels, the venting grooves quickly equalize the pressure by ensuring a free and open outlet for the compound. In effect, a uniform pressure differential is maintained between port 98 and the ambient atmosphere via venting grooves 104. This minimizes the risk of clogging the feed channels with compound.

If the tape should be transversely forced toward a feed channel to block it, the venting grooves will prevent this blockage by allowing the compound to flow therethrough and exit the nozzle thereby equalizing the pressure between the feed channels and across the tape. In effect, the tape cannot be sufficiently deformed into the venting grooves by any intermittant compound pressure differential. The tape is further prevented from such deformation by the supporting surfaces 106 provided on the recess 90. The supporting surfaces maintain the tape in a generally planar form spaced from the venting ports thereby ensuring free access of the compound to ambient. By guaranteeing free continuous passage of the compound through the nozzle body an even and continuous application of compound will result, notwithstanding an uneven tape application rate, or even a jerking stop-and-go application of tape.

Conventional applicators usually apply compound over the entire underside of the tape. This often leaves bulges or ridges of compound along the edges of the tape as the compound is squeezed sidewardly from beneath the tape. These ridges must be wiped away. This wiping is burdensome, time consuming and uneconomical. These drawbacks are avoided by the relative dimensioning of the feed channels 102 and venting ports 104. These channels and ports are formed sufficiently large to allow a free flow of compound therethrough but are sufficiently small to prevent excess compound from escaping the nozzle body.

By applying a series of spaced apart beads of compound to the tape in a controlled manner, an extremely clean and efficient taping application is achieved. The beads of compound are applied only to the interior portion of the tape so as to leave the edges of the tape dry. When the tape is applied to wallboard, these dry edge areas are covered with compound as the compound is transversely forced under these edges by the manual pressure applied by the operator with nose portion 96 of the applicator.

Once the tape exits the nozzle body, it is pressed against the wallboard by the lower face or nose portion 96 of the casing to the effect the spread of compound beneath the tape. Since the compound tends to spread out toward the edges of the tape whenapplied to the wallboard under the compressive force of the trough 46,96, there is no need to apply compound over the entire width of the tape. This feature prevents the waste of compound and, more importantly, obviates any clean-up or wiping procedures after the tape has been applied to the wallboard.

An applicator constructed in accordance with the description set forth above is easy to manipulate due to its relatively light weight. Since only a small amount of compound is stored within the applicator head, the weight of the compound is negligible. Moreover, the moving parts of the applicator have been minimized to increase its reliability and minimize repairs. Since the under surface of the nozzle casing laterally spreads the compound under the dry edge sections of the tape in a predetermined manner, no excess compound is extruded or spread beyond the sides of the tape. This obviates any clean-up or subsequent wiping procedure which saves times, saves compound and results in a superior tightly covered corner joint.

Obviously, numerous modifications and variations of the present invention are possible in light of the above teachings. It is therefore to be understood that within the scope of the appended claims, the invention may be practiced otherwise than as specifically described herein. For example, instead of applying the compound in a series of beads, a single elongated feed channel 102 may be provided on each side of the nozzle body, so that at least one bead of compound is applied to each "side" of the folded tape, thereby resulting in two beads on the underside of the unfolded tape.

What is claimed is:

1. An applicator head for applying wallbord tape and pressurized wallboard compound to wallboard and the like, comprising:

a nozzle body for receiving said compound, said nozzle body having an internal passage with opposing sidewalls formed therein for guiding said tape therethrough; and feed channel means operatively associated with said nozzle body for applying said compound in a plurality of beads along said tape, said feed channel means comprising a plurality of spaced apart channels formed within surface portions of each one of said opposing sidewalls of said internal passage.

2. The applicator of claim 1, wherein said nozzle body is formed with a pair of headers for distributing said compound to said feed channel means.

3. The applicator of claim 1, further comprising venting means extending between said feed channel means and the ambient environment for preventing clogging of said feed channel means.

4. The applicator of claim 1, further comprising support means disposed adjacent said feed channel means for preventing said wallboard tape from clogging said feed channel means.

5. The applicator of claim 1, wherein said nozzle body comprises a pair of longitudinally extending body half members.

6. The applicator of claim 1, further comprising trough means operatively associated with said nozzle body, said trough means comprising means for guiding and forcing said wallboard tape into a corner joint.

7. The applicator of claim 1, further comprising roller means operatively associated with said applicator head for rolling said applicator head over said wallboard and the like.

8. The applicator of claim 1, wherein said nozzle body is formed with an entry port for receiving said compound, said entry port leading to a roof portion which bridges said opposing sidewalls such that said compound passes over said roof portion and enters said feed channel means.

* * * * *